United States Patent [19]

Bachand

[11] 4,161,303
[45] Jul. 17, 1979

[54] KNOCKDOWN CONNECTOR AND GUIDEWAY ASSEMBLY

[76] Inventor: Pierre Bachand, 149 rue Maurice, Roseméré, Quebec, Canada

[21] Appl. No.: 866,772

[22] Filed: Jan. 3, 1978

[51] Int. Cl.² ............................................... A47G 29/02
[52] U.S. Cl. ..................................... 248/246; 108/108; 211/193
[58] Field of Search ............... 248/243, 245, 246, 244, 248/247, 248, 295; 211/190, 193, 187; 108/106, 107, 108, 109; 151/63, 41.7; 24/221 K

[56] References Cited

U.S. PATENT DOCUMENTS

| | | | |
|---|---|---|---|
| 1,055,201 | 3/1913 | Mason | 248/244 |
| 1,231,000 | 6/1917 | Crist et al. | 248/245 |
| 2,002,339 | 5/1935 | Copeman | 248/245 V X |
| 2,601,213 | 6/1952 | Poupitch | 24/221 K X |
| 3,125,970 | 3/1964 | Schneider | 108/109 |

FOREIGN PATENT DOCUMENTS

| | | | |
|---|---|---|---|
| 234585 | 3/1909 | Fed. Rep. of Germany | 248/246 |
| 514999 | 2/1955 | Italy | 248/246 |

Primary Examiner—J. Franklin Foss

[57] ABSTRACT

A connector is readily assembled to, and disassembled from, a box-shaped channel or guideway for the construction of knockdown furniture, shelving and the like. The box-shaped channel is a standard extrusion formed by a back wall, side walls and two inwardly directed flanges which taper towards a central slot. The connector includes a base member having flat terminal portions, of uniform thickness, and wedgingly engageable with the tapered flanges upon rotation of the base member about a central rotational axis perpendicular to the back wall of the channel. Thus, the base member is firmly held in any position longitudinally of the channel.

5 Claims, 12 Drawing Figures

U.S. Patent Jul. 17, 1979 Sheet 1 of 2 4,161,303
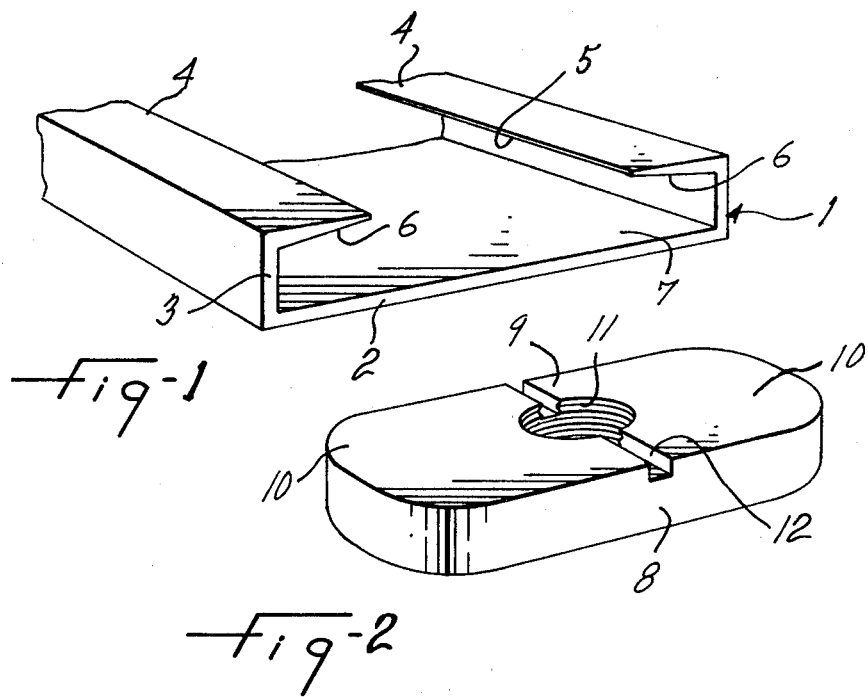
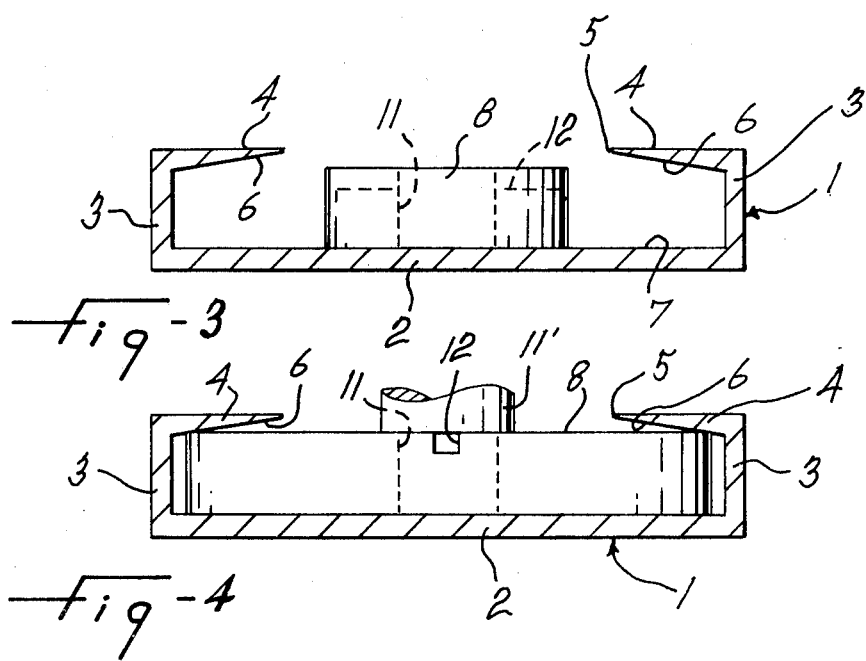

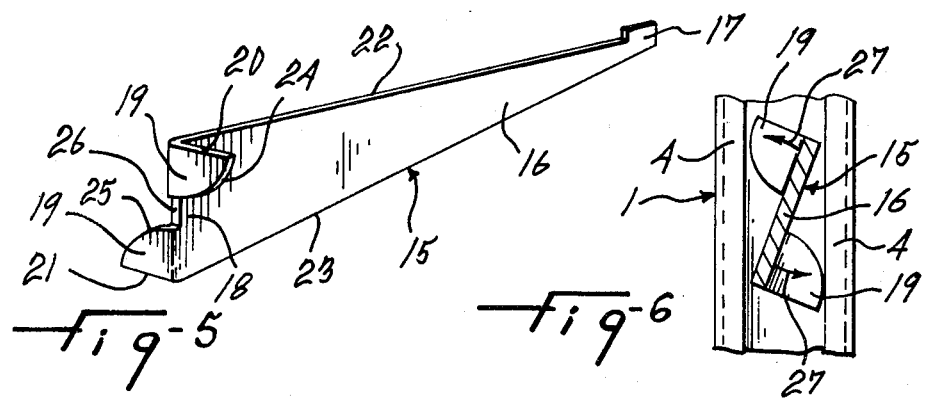
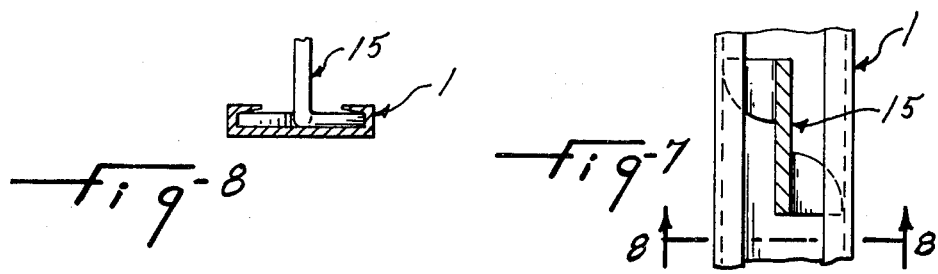
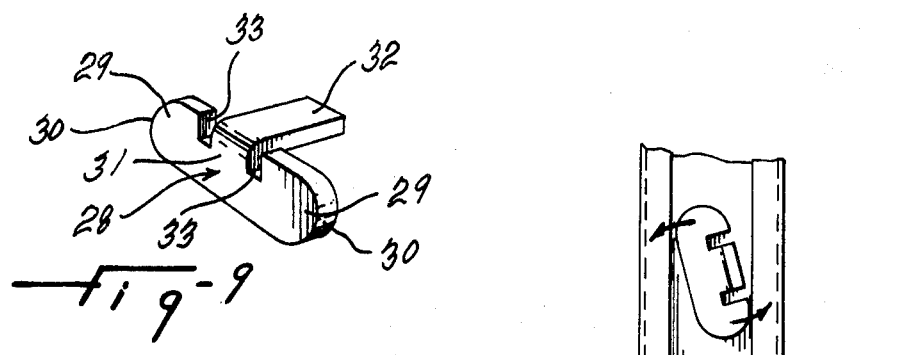
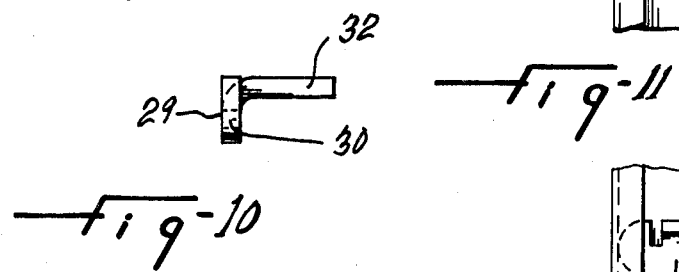
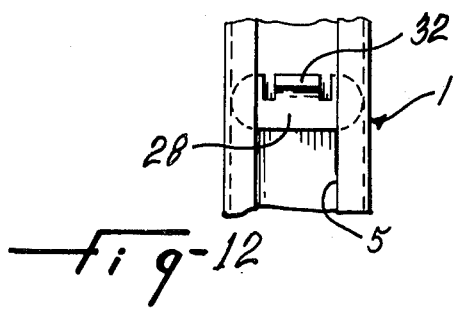

KNOCKDOWN CONNECTOR AND GUIDEWAY ASSEMBLY

The present invention relates to a knockdown connector and guideway assembly for the construction of knockdown furniture, shelving and the like.

My U.S. Pat. No. 4,035,097 dated July 12, 1977, describes an assembly of the above-noted type in which an elongated base member is insertable through a slot of a box-shaped channel guideway and rotatable about a central pivotal axis perpendicular to the back wall of the guideway, so that its terminal portions becomes in wedging engagement with the flanges of the channel. However, in my prior Patent, the end portions of the base member have to be machined transversely of the elongated member to provide a camming surface for that wedging engagement, resulting in increased production cost.

It is the general object of the present invention to provide an assembly of the character specified in my previous Patent, which has a diminished manufacturing cost, inasmuch as the above machining is eliminated.

In accordance with the present invention, advantage is taken of the fact that the box-shaped channel member can be extruded with flanges having an internal surface inclined to the inside face of the back wall of the channel, whereby an effective wedging effect is obtained without having to machine the end portions of the base member, the latter, therefore, being made of a metal sheet, of uniform thickness.

The foregoing will become more apparent during the following disclosure by referring to the drawings, in which like reference characters indicate like elements throughout.

FIG. 1 is a perspective view of one end portion of a channel member or guideway, having transversely tapering flanges in accordance with the invention;

FIG. 2 is a perspective view of a base member adapted to be wedgingly engaged within the channel of FIG. 1;

FIGS. 3 and 4 are cross-sections of the channel member with the base member aligned longitudinally, and transversely, of the channel member, respectively;

FIG. 5 is a perspective view of a shelf bracket having a base member means in accordance with a second embodiment of the invention;

FIG. 6 is an elevation of the channel of FIG. 1 in which the shelf bracket of FIG. 5 is inserted;

FIG. 7 is a view similar to that of FIG. 6 but with the shelf bracket rotated to a blocked position within the channel;

FIG. 8 is a cross-section along line 8—8 of FIG. 7;

FIG. 9 is a perspective view of another type of connector;

FIG. 10 is a side elevation of the connector of FIG. 9; and

FIGS. 11 and 12 are views similar to FIGS. 6 and 7, but using the connector of FIG. 9 shown in released and blocked position, respectively.

In the drawings, like reference characters indicate like elements throughout.

In all embodiments, there is provided a box-shaped guideway or channel member 1 defining a back wall 2, side walls 3 and a pair of flanges 4, respectively, attached to the free edges of the side walls 3 and inwardly directed towards each other to define a central longitudinal slot 5 of uniform width throughout the length of the channel 1. The channel 1 is extruded such that the flanges 4 taper towards their free edge defining inside faces 6 which diverges from the opposite internal face 7 of the back wall 2 in a transverse direction relative to the long axis of the channel and towards the central slot 5.

The knockdown connector in accordance with the first embodiment consists of an elongated flat base member 8 including a central support portion 9 between a pair of opposite end portion 10. The base member is flat and of uniform thickness throughout, so that its main faces are parallel to each other. The width of the elongated base member 8 is smaller than the width of the slot 5 of the channel, while the length of the elongated base member is greater than the width of said slot but smaller than the distance between the inside surfaces of the two side walls 3 of channel member 1.

The thickness of the base member 8 is intermediate the minimum and maximum distances between the inside face 7 of the back wall 2 and the inside face 6 of each flange 4. Thus, the base member can be inserted through the slot while it is in longitudinal alignment with the channel member and when the base member is rotated to a blocked position transverse to the slot, its back face forms a reaction surface resting on the inside face 7 of the back wall 2, while its top main face becomes in wedging engagement with the inside inclined surfaces 6 of the flanges 4, as clearly shown in FIG. 4. The central portion 9 at the front main face of the base member exposed through the slot 5 is formed with a threaded bore 11 and a screwdriver slot 12. The slot 12 is adapted to receive the tip of a screwdriver to rotate the base member between its two positions with respect to the channel. The bore 11 is adapted to receive the threaded end of a holding member, for instance a bolt 11' for securing a shelf bracket or the like to the base member.

FIG. 5 shows a shelf bracket 15, consisting of an elongated arm portion 16, tapering towards its outer end 17 and having a base member 18 integral with the inner end of arm 16 and which is of elongated shape transversely of the arm 16 and has outer end portions 19 which consist of co-planar wings bent at right angles to arm 16 in opposite directions and each of generally triangular shape defined by a straight edge 20, 21, respectively, forming a continuation of and merging with the top edge 22 and bottom edge 23 of the arm 16. Each wing, or outer end portion 19, is further defined by a curved edge 24, 25, respectively, merging with the top and bottom edges 20 and 21 at the outer ends of the latter and with the straight free edge 26 of the base member 18.

The bracket 15 is made of flat sheet metal and the wings, or outer end portions 19, have uniform thickness which is equal to a value intermediate the maximum and minimum distances between the inner face 6 of the flanges 4 of the channel 1 and the inside face 7 of the back wall 2 of said channel. The width of the base member 18 is less than the width of the slot 5, so that the base member 18 can be inserted within the channel 1, as shown in FIG. 6, with the arm 16 inclined to the long axis of the channel, so that the wings 19 can clear the edges of the flanges and be engaged between the flanges and the back wall upon rotation of the bracket, as shown by the arrows 27. During this rotation, the wings 19 become wedged between the back wall and the flanges of the channel, as shown in FIG. 7. Here again, wedging is effected solely between the flanges and the back wall since the outer edges of the outer end portions 19 cannot become wedged with the inside faces of the side walls due to the inclination of the line joining the tips of the wings 19 relative to channel 1. The shelf bracket is firmly blocked in any adjusted position along channel 1, the latter disposed in upright position, for instance, against a wall with the slot facing towards the interior of the room.

FIGS. 9 to 12 show another embodiment of the invention. Here the connector consists of an elongated flat base member 28, having outer end portions 29, each with a rounded edge 30. The central portion 31 has an integral extension bent at right angle to the plane of the base member and forming a tab 32 adapted to support a shelf, or the like. The tab 32 is flanked on both sides by notches 33 made in the base member to facilitate bending of the same. The base member is made of flat stock defining substantially flat and parallel main faces, which are the reaction and camming surfaces, respectively, of the connector.

The width of the connector is less than the width of the slot 5 of the channel 1 and the length of the base member is greater than the width of the slot but slightly less than the distance between the inside faces of the side walls of the channel. Thus, the base member 28 can be inserted through slot 5 while in substantial alignment with the channel 1 with its reaction surface flat against the inside face of the back wall, as shown in FIG. 11, then rotated in accordance with arrows 34 to a position substantially transverse to the channel where it becomes wedged between the flanges and the back wall of the channel. In this position, (see FIG. 12) tab 32 freely extends through the slot 5. In this embodiment, four channels 1 are positioned in upright position and the channels form, for instance, four posts for shelving with the slots 5 facing each other two by two.

What I claim is:

1. A knockdown connector and guideway assembly wherein the guideway is a box-shaped channel having a back wall, side walls and co-planar flanges extending from the outer edges of said side walls towards each other and separated by a slot, of uniform width, extending longitudinally of said channel, the inside face of said back wall and the inside faces of said flanges being uniformly spaced-apart longitudinally of the channel, but the inside faces of said flanges diverging transversely of the channel from said side walls towards said slot with respect to the inside face of said back wall, and wherein the connector includes an elongated base member having a central portion and opposite end portions, said opposite end portions being flat and co-planar with opposed substantially parallel main flat faces, said end portions having a uniform thickness of a value lying between the maximum and minimum distance between the inside face of each flange and of the back wall, said base member having a width less than the width of said slot and a length greater than the width of said slot, said base member being insertable within said channel through said slot and being rotatable in said channel about an axis of rotation passing through said central portion and substantially perpendicular to the inside face of said back wall to a blocked position wherein said end portions become wedged between the inclined inside surfaces of said flanges and the inside surface of said back wall with the back flat surface of said connector in close contact with the inside surface of the back wall of said channel, and a holding member secured to said base member and extending through said slot.

2. A knockdown connector and guideway assembly as claimed in claim 1, wherein said holding member is integrally connected to said base member and extends substantially at right angles to the main plane of said outer end portions.

3. A knockdown connector and guideway assembly as claimed in claim 1, wherein said holding member is a shelf support arm integrally connected to said base member and the outer ends of said base member consist of oppositely directed wings extending at right angles to the long axis of said arm at the inner end of the latter.

4. A knockdown connector and guideway assembly as claimed in claim 1, wherein said holding member is a tab integrally connected to said base member and extending at substantially right angle from a longitudinal edge of the latter, and wherein the end portions of said base member are provided with round corners to facilitate wedging.

5. A knockdown connector and guideway assembly as claimed in claim 1, wherein said base member has a threaded bore opening at a main face thereof, exposed through said slot when said base member is in blocked position within said channel, said holding member screwed within said bore.

* * * * *